United States Patent [19]

Allison

[11] 4,171,929
[45] Oct. 23, 1979

[54] BLADE FOR WINDMILL

[76] Inventor: William D. Allison, 39 Radnor Cir., Grosse Pointe Farms, Mich. 48236

[21] Appl. No.: 810,106

[22] Filed: Jun. 27, 1977

[51] Int. Cl.² .............................................. F03D 1/06
[52] U.S. Cl. ...................................... 416/226; 416/237
[58] Field of Search ............... 416/200 R, 200 A, 226, 416/231 B, DIG. 3, 233, 227 A, 194, 210 R, 210 A, 213 A, 232, 237 R, 237 A; 29/156.8 B, 156.8 P, 156.8 H, 156.8 T, 156.8 R

[56] References Cited

U.S. PATENT DOCUMENTS

| 20,744 | 6/1858 | Thurber | 416/237 |
|---|---|---|---|
| 315,484 | 4/1885 | Cosby | 416/237 |
| 1,073,413 | 9/1913 | Faehrmann | 416/200 |
| 1,552,637 | 9/1925 | Motheral | 416/237 A |
| 2,083,993 | 6/1937 | Hall | 416/237 |
| 2,659,528 | 11/1953 | Price | 416/237 |
| 3,059,834 | 10/1962 | Hausammann | 416/237 |
| 4,065,225 | 12/1977 | Allison | 416/11 X |

FOREIGN PATENT DOCUMENTS

| 11914 | 4/1933 | Australia | 416/226 |
|---|---|---|---|
| 590196 | 6/1925 | France | 416/237 |
| 681815 | 10/1952 | United Kingdom | 416/237 |

Primary Examiner—Everette A. Powell, Jr.
Attorney, Agent, or Firm—Fisher, Gerhardt & Groh

[57] ABSTRACT

A blade for windmills fabricated of sheet metal to form a generally hollow structure containing a reinforcing member. The surfaces of the blade are such that the forward surface is flat and rear of the blade is formed by two surfaces which extend in opposite directions from a line extending from a radially inner point at a rearward side of the pitch axis of the blade to a point at the radial outer end and forward of the pitch axis of the blade.

12 Claims, 8 Drawing Figures

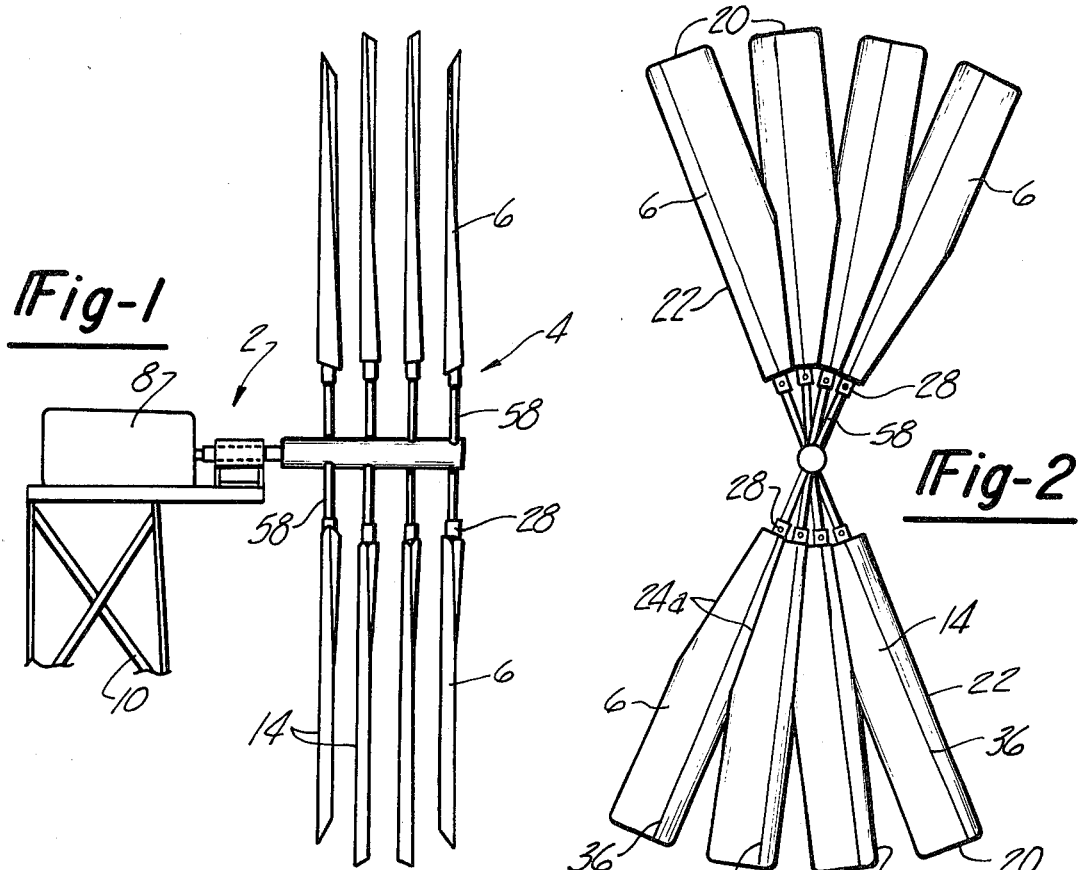
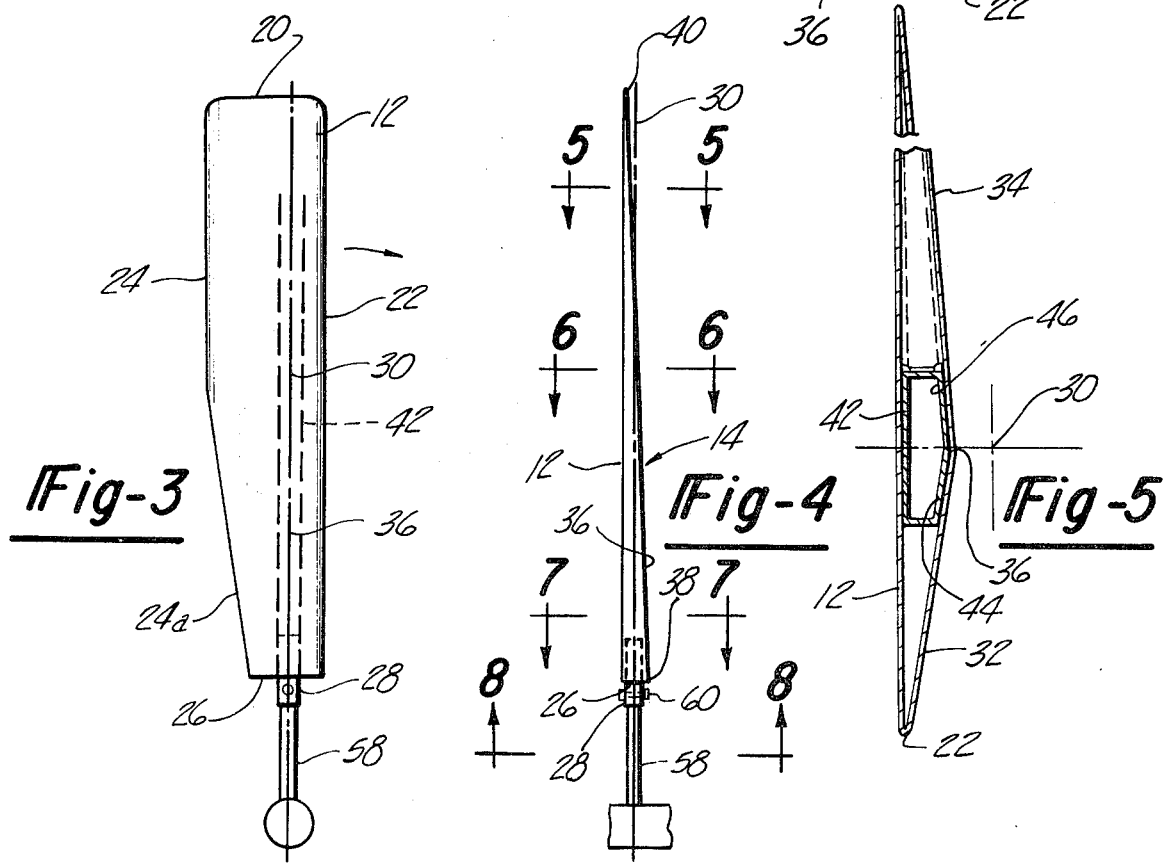

BLADE FOR WINDMILL

This invention relates to blades for windmills and to a method of fabricating such blades.

Large blades for windmills become very heavy particularly for windmills having a diameter to the order of 20 or 30 feet and it therefore becomes important to manufacture the blades so that they remain rigid but at the same time of low weight. Also with some windmills of the multi-vane type having more than one pair of diametrically opposed blades, factory assembly is not possible because it prohibits transport of the completed product to the installation site. Consequently such windmills must be fabricated in a manner permitting complete assembly at the erection site. In addition to the fabrication problems it is of course important that the vanes have a configuration making them efficient in operation.

It is an object of the invention to provide a blade for windmills and the method of making such blades which can be formed of flat sheets of metallic material.

Another object of the invention is to provide a blade for windmills which is easily assembled at the erection site with a minimum of parts and tools.

Another object of the invention is to provide a blade assembly for windmills which has a unique configuration giving it a high degree of efficiency.

A vane or blade structure for a windmill is provided in which the blade has a generally flat forward face and rearward facing surfaces which extend at an angle to each other from a straight line extending between a radially inner point at one side of the pitch axis of the blade to a point at the outer radial tip of the blade and at the opposite side of the pitch axis of the blade. Also the pitch axis extends approximately three-tenths of the distance from the leading edge of the blade. The entire blade surface is constructed of sheet metal to form a hollow structure the interior of which contains a reinforcing member which serves to make the blade rigid and to support a mounting member at its radial inner end so that the mounting member may be easily attached to and detached from a hub structure which supports the blades for rotation.

These and other objects will become apparent from the following disclosure and the drawings in which:

FIG. 1 is a side elevation of a windmill incorporating blades embodying the invention;

FIG. 2 is a rear elevation of the windmill as viewed from downwind;

FIG. 3 is an elevation of one of the blades viewed from the front or upwind face of the blade;

FIG. 4 is a side view of the blade seen in FIG. 3;

FIG. 5 is a cross-sectional view at an enlarged scale taken on line 5—5 in FIG. 4;

Figure 6:
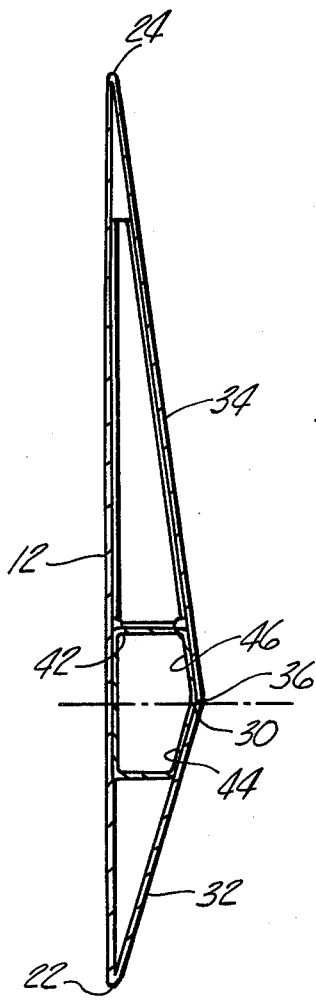
FIG. 6 is a cross-sectional view similar to FIG. 5 taken on line 6—6 in FIG. 4.

Referring to the drawings a windmill embodying the invention is designated generally at 2 and includes a turbine 4 made up of the plurality of pairs of blades 6. Each pair of blades 6 is indexed relative to the adjacent upwind blades 6 and in the direction of rotation approximately 15 degrees. Four pairs of blades 6 having the configuration seen in the drawings are illustrated. The turbine may drive various rotational devices such as a generator 8 and the turbine and generator may be located at the top of a tower or mast 10. A windmill of this type is disclosed in my copending patent application Ser. No. 679,157 filed Apr. 22, 1976.

The blades 6 which make up the turbine 4 are generally elongated and as seen in FIGS. 3 and 4 each blade has a forward surface 12 adapted to face the wind and a rearward surface 14 facing in a downwind direction. Each blade has a radial outer tip edge 20, a leading edge 22, a trailing edge 24 and a radially inner end 26.

The radial inner end 26 of the blade 16 is provided with a mounting tube 28, the axis of which is coaxial with the pitch axis of the blade 6 designated as 30. The pitch axis is the axis of the blade 6 about which the blade is angled or positioned to determine the angle of attack made by the forward blade surface 12 to the plane of rotation of the blade. This angle is known as the pitch angle.

The rearward surface 14 of the blade 6 is made up of a pair of surfaces 32 and 34. The surfaces 32 and 34 extend in opposite directions from a straight line 36 which extends longitudinally of the entire blade 6 from a point 38 at the radially inner end of the blade 6 to a point 40 at the radial outer end of the blade. Also the line 36 is disposed in an imaginary plane extending perpendicular to the forward surface 12 and parallel to the leading edge 22. This plane and therefore the straight line 36 is disposed approximately three tenths of the maximum cord of the blade 6 as measured from the leading edge 22 to the trailing edge 24. The pitch axis 30 also is disposed in this imaginary plane and in spaced, parallel relationship to the forward surface 12.

The outer point 40 is disposed forwardly of the pitch axis 30 and the radial inner point 38 is disposed at the opposite side of the pitch axis 30 with the line 32 extending so that it intersects the pitch axis approximately midway between the two ends of the blade 6. The radial outer tip edge 20 of the blade 6 is relatively flat and thin. The radial inner of the blade 6, however, forms a triangle with the rear leading surface 32 and rear trailing surface 34 being approximately equal in length as seen in FIG. 8.

The forward surface 12 and rearward surface 14 of the blade 6 are formed of sheet metal so that the blade is relatively hollow. The interior of the blade contains an elongated frame member 42 which extends for almost all of the length of the blade 6. The frame member has a varying cross section but in general it can be described as being rectilinear so that the frame 42 forms a rectilinear tube. As seen in FIG. 5 the frame 42 has angled walls 44 and 46 conforming to the surfaces 32 and 34 respectively. As seen in FIG. 6 the walls 44 and 46 are angled more sharply to conform to the surfaces 32 and 34, respectively and a pitch axis 30 is located within the tubular frame member. As viewed in FIG. 7 the walls 44 and 46 are spaced apart by a wall section 48 with the walls 44 and 46 conforming, respectively, with the rear leading surface 32 and rear trailing surface 34. In this case the pitch axis 30 is disposed generally centrally of the frame section and axially of the mounting tube 28.

Figure 7:
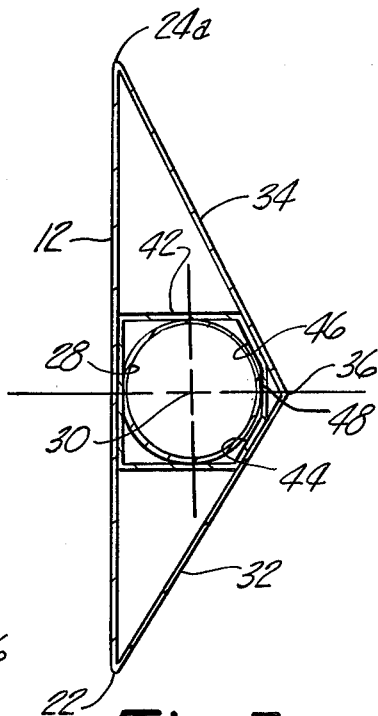
FIG. 7 is a cross-sectional view similar to FIG. 6 taken on line 7—7 in FIG. 4.

The radially inner end of the blade 6 supports the mounting tube 28 which is seen in FIGS. 3 and 4 projects into the frame member 42 with a short portion being exposed at the radial inner end 26 of the blade 6. As seen in FIG. 7, the contacting surfaces of the mounting tube 28 and frame member 42 are welded to each other to maintain the tube in fixed position.

Figure 8:
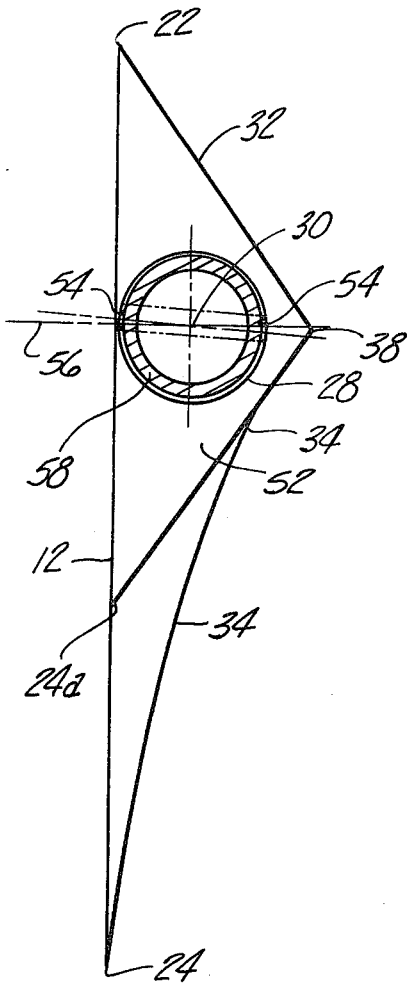
FIG. 8 is an end view of the blade in FIG. 3.

As viewed in FIG. 8 the blade 6 has an inner end wall 52 which serves to close the relatively hollow blade structure. The sheet metal skin forming the forward surface 12, the rear surfaces 32 and 34 and the end wall 52 may be welded together with the wall 52 closing the hollow structure against the entry of moisture and to minimize noise during rotation of the blade.

A pair of diametrically opposed holes 54 are formed in the mounting tube 28 adajcent to the end wall 52 with the holes being disposed on a diameter extending at an angle to the plane of rotation corresponding to the preferred or selected pitch angle. The mounting tube 28 telescopes on a radially extending support member or shank 58 forming part of the turbine with the holes 54 aligned with corresponding holes in the shank 58. A bolt 60 extending through the aligned holes is all that is required to maintain the blade in position in the turbine.

In considering the configuration of the blade it will be noted that the forward surface 12 is flat whereas the leading surface 32 at the rear of the blade 6 and the trailing surface 34 also at the rear of the blade have a warp. This is particularly noticeable with respect to the trailing surface 34. By warp is meant a twist in the surface. The line 36 is straight between the point 38 and point 40 and the leading edge 22 also is straight. However, the distances between the line 36 and the leading edge 22 becomes progressively shorter as the outer radial tip 20 is approached and this gives a twist or warp to surface 32. Similarly, a warp is formed in the rear surface 34 which is clearly visible in FIG. 8.

The trailing edge 24 of the blade 6 at the radially outer end of the blade is parallel to the leading edge 22. The trailing edge 24a of the radially inner one half of the blade is formed at an angle to the edge 24. The reason for this is that when the blades 6 are assembled in a turbine 4 made of multiple pairs of blades, the radial inner ends of the blades 6 tend to overlap if the blades were completely rectangular and such overlap places the forward surface 12 of downwind blades in the shadow of the upwind blades. Consequently the radial inner surface is eliminated since it is not productive in utilizing wind force.

It has been found that the disclosed blade 6 is extremely efficient and its efficiency may be attributable to the change in direction between the rear leading surface 32 and the rear trailing surface 34. This change in direction at line 32 appears to reduce the skin friction drag from the line 36 to the trailing edge 24. Also it has been found that a modest increase in performance is obtained when the forward face or surface 12 of the blade 6 is formed with a slight concavity. The concavity may be so slight that it is difficult to illustrate at the small scale of the drawings.

A blade for windmills has been provided in which the blade is fabricated of sheet metal to form a hollow structure containing a reinforcing member which makes the blade light and at the same time stiff. The surfaces of the blades are such that the forward surface is generally flat and the rear surface is formed of two warped surfaces which extend in opposite directions from a line disposed in the plane of the pitch axis and extending from a point at the radially inner end rearwardly of the pitch axis to a point at the radially outer end forwardly of the pitch axis. Also the pitch axis is disposed approximately three-tenths of the maximum cord of the blade from the leading edge of the blade.

The blades 6 are easily assembled and disassembled from the shaft of the turbine 4 since the blades are attached to the shanks 58 by a single bolt. This makes it possible to transport the turbine in a disassembled condition to the erection site were only common tools are required to make the assembly. Moreover, it makes it possible to remove a pair of blades 6 for repair or replacement and permits continued operation of the turbine with the remaining pairs of blades of the turbine.

A blade for windmills has been provided in which the blade is fabricated of sheet metal to form a generally hollow structure containing a reinforcing member. The surfaces of the blade are such that the forward surface is generally flat and the rear surface is formed of two surfaces disposed at an angle to each other and extending in opposite directions from a line which extends from a point at the radially inner end rearwardly of the pitch axis of the blade to a point at the radial outer end forward of the pitch axis. Also the pitch axis is disposed approximately three-tenths of the maximum width of the blade rearwardly of the leading edge of the blade. The blade is easily assembled in a wind turbine and is detachably connected thereto by a single bolt.

The embodiments of the invention in which an exclusive property or privilege is claimed are defined as follows:

1. A vane structure for a windmill comprising; a blade member having a pitch axis extending longitudinally thereof, a tubular mounting member connected to a radially inner end of said blade member co-axially with said pitch axis, said blade member having a substantially flat forward face surface disposed parallel to said pitch axis, said pitch axis being spaced from the leading edge of said blade at the radial outer end of said blade a distance less than the distance from the trailing edge and in a plane at right angles to said forward face surface, said blade having a rear face with surfaces diverging in opposite directions from a straight line disposed in said plane said line extending between a first point at the radial outer end of said face surface of said blade and a second point at the radial inner end of said blade and at one side of said pitch axis.

2. The combination of claim 1 in which said forward face surface is disposed at one side and forwardly of said pitch axis.

3. The combination of claim 1 in which said pitch axis is spaced from the leading edge of said blade a distance of approximately three-tenths of the maximum cord of said blade.

4. The combination of claim 1 in which said line between said diverging surfaces extends from between points at the radial outer and inner ends of said blades and at opposite sides of said pitch axis.

5. The combination of claim 1 in which said first point is disposed forwardly of said pitch axis and said second point is disposed rearwardly of said pitch axis.

6. The combination of claim 1 in which the pitch angle between the forward face of said blade member and the plane of rotation remains constant and in which the angle between the surface of said rear face and plane or rotation adjacent said leading edge increases progressively from the radial outer end to the radial inner end of said blade member.

7. The combination of claim 1 in which said forward face and rear face of said blade are formed of sheet metal.

8. The combination of claim 7 in which said sheet metal forms a generally hollow blade member, said hollow blade member containing a frame member disposed therein to reinforce said blade member.

9. The combination of claim 8 in which said frame member is generally tubular in cross section and is disposed substantially coextensive with said pitch axis.

10. The combination of claim 9 in which said tubular mounting member is fixed in said tubular frame member at a radial inner end of said blade member.

11. The combination of claim 1 and further comprising a windmill rotor shaft having diametrically extending shank members, and means detachably connecting said tubular mounting member to one of said shanks.

12. The combination of claim 11 in which said means detachably connecting said mounting member and shank comprises a single bolt extending transversely of said mounting member and shank.

* * * * *